(12) United States Patent
Endo et al.

(10) Patent No.: US 8,029,064 B2
(45) Date of Patent: Oct. 4, 2011

(54) CONNECTION DEVICES IN VEHICLE SEATS

(75) Inventors: Takayuki Endo, Toyota (JP); Hideki Uramichi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 223 days.

(21) Appl. No.: 12/416,403

(22) Filed: Apr. 1, 2009

(65) Prior Publication Data

US 2009/0250990 A1 Oct. 8, 2009

(30) Foreign Application Priority Data

Apr. 8, 2008 (JP) ................................. 2008-100048

(51) Int. Cl.
*B60N 2/22* (2006.01)
*B60N 2/235* (2006.01)
(52) U.S. Cl. ................................ 297/367 R; 297/367 P
(58) Field of Classification Search .............. 297/367 R, 297/367 P
See application file for complete search history.

(56) References Cited

U.S. PATENT DOCUMENTS

| | | | | |
|---|---|---|---|---|
| 5,216,936 A * | 6/1993 | Baloche | ............... | 297/367 R X |
| 5,681,086 A * | 10/1997 | Baloche | .................. | 297/367 R |
| 5,779,313 A * | 7/1998 | Rohee | .................. | 297/367 R |
| 5,788,325 A * | 8/1998 | Ganot | ................... | 297/367 R X |
| 5,820,218 A * | 10/1998 | Baloche et al. | ............. | 297/367 R |
| 5,820,219 A * | 10/1998 | Rohee | .................. | 297/367 R |
| 5,984,413 A * | 11/1999 | Baloche et al. | ............. | 297/367 R |
| 6,007,153 A * | 12/1999 | Benoit et al. | ........... | 297/367 R X |
| 6,082,821 A * | 7/2000 | Baloche et al. | ........ | 297/367 R X |
| 6,095,608 A * | 8/2000 | Ganot et al. | .............. | 297/367 R |
| 6,164,723 A * | 12/2000 | Ganot | .................. | 297/367 R X |
| 6,325,458 B1 * | 12/2001 | Rohee et al. | ............. | 297/367 R |
| 6,328,383 B2 * | 12/2001 | Rohee et al. | ............. | 297/367 R |
| 6,364,413 B1 * | 4/2002 | Rohee et al. | ............. | 297/367 R |
| 6,402,249 B1 * | 6/2002 | Rohee et al. | ............. | 297/367 R |
| 6,554,361 B2 * | 4/2003 | Reubeuze et al. | ........ | 297/367 R |
| 6,561,585 B2 * | 5/2003 | Cilliere et al. | ............ | 297/367 R |
| 6,669,297 B2 * | 12/2003 | Cilliere et al. | ............ | 297/367 R |
| 6,726,281 B2 * | 4/2004 | Baloche | ................... | 297/367 R |
| 7,066,541 B2 * | 6/2006 | Uramichi | ................. | 297/367 R |
| 7,168,764 B2 * | 1/2007 | Reubeuze et al. | ......... | 297/367 R |
| 7,475,945 B2 * | 1/2009 | Reubeuze et al. | ......... | 297/367 R |

(Continued)

FOREIGN PATENT DOCUMENTS

DE 69600369 11/1998

(Continued)

OTHER PUBLICATIONS

English language Abstract of JP 2007-130237 A (May 31, 2007).

(Continued)

*Primary Examiner* — Rodney B. White
(74) *Attorney, Agent, or Firm* — Greenblum & Bernstein, P.L.C.

(57) ABSTRACT

A connecting device may include first and second connecting elements that are axially oppositely coupled to each other so as to be rotatable relative to each other, a locking member that is positioned between the first and second connecting elements, an operating member that is positioned between the first and second connecting elements, and a retainer member that is arranged and constructed to circumferentially clamp the first and second connecting elements. The retainer member has a retainer portion and is fixed to the first connecting element while the second connecting element is axially supported by the retainer portion of the retainer member.

2 Claims, 12 Drawing Sheets

U.S. PATENT DOCUMENTS

| | | | |
|---|---|---|---|
| 7,497,520 B2 * | 3/2009 | Assmann | 297/367 R |
| 7,614,700 B2 * | 11/2009 | Peters | 297/367 R |
| 7,744,157 B2 * | 6/2010 | Ishihara et al. | 297/367 P |
| 7,766,429 B2 * | 8/2010 | Kuroda et al. | 297/367 P |
| 7,819,471 B2 * | 10/2010 | Ishihara et al. | 297/367 P X |
| 7,823,978 B2 * | 11/2010 | Ishihara et al. | 297/367 P X |
| 2001/0001220 A1 * | 5/2001 | Rohee et al. | 297/367 |
| 2004/0036338 A1 * | 2/2004 | Lardais et al. | 297/367 |
| 2007/0137393 A1 * | 6/2007 | Peters | 74/502.4 |
| 2008/0203799 A1 * | 8/2008 | Yamada | 297/367 |
| 2009/0250989 A1 * | 10/2009 | Endo et al. | 297/367 P |
| 2010/0308635 A1 * | 12/2010 | Tame et al. | 297/367 P |

FOREIGN PATENT DOCUMENTS

| | | |
|---|---|---|
| EP | 1806072 | 9/2010 |
| JP | 2007-130237 A | 5/2007 |
| WO | 2007/034683 | 3/2007 |

OTHER PUBLICATIONS

U.S. Appl. No. 12/408,947 to Endo et al., filed Mar. 23, 2009.
Germany Office action, mail date is Nov. 19, 2010.

* cited by examiner

CONNECTION DEVICES IN VEHICLE SEATS

This application claims priority to Japanese patent application serial number 2008-100048, the contents of which are incorporated herein by reference.

BACKGROUND OF THE INVENTION

1. Field of the Invention

The present invention relates to connection devices in vehicle seats. More particularly, the present invention relates to connection devices for rotatably connecting two components (i.e., seat backs and seat cushions) of vehicle seats.

2. Description of Related Art

Generally, a vehicle seat includes a seat back and a seat cushion. The seat back and the seat cushion are rotatably connected via a seat reclining device for adjusting a tilt angle of the seat back. Such a seat reclining device is taught, for example, by Japanese Laid-Open Patent Publication Number 2007-130237.

The known seat reclining device includes a pair of opposing disk-shaped housings, i.e., a first or rotational housing (ratchet) and a second or stationary housing (guide). The first housing is affixed to the seat back. The second housing is affixed to the seat cushion. The first and second housings are circumferentially connected by an annular fastener or clip ring along peripheral edges thereof, so that the first housing can move or rotate around a rotational shaft relative to the second housing.

The seat reclining device further includes a locking mechanism that can prevent the first housing from rotating relative to the second housing, so as to lock the seat reclining device. The locking mechanism essentially consists of a slide cam and slide pawls that are positioned between the housings. The slide cam is slidably received between guide members that are formed within the second housing, so as to radially move on the second housing when the rotational shaft is rotated. Conversely, the slide pawls are slidably received between the guide members, so as to radially move on the second housing. Further, the slide pawls are respectively arranged so as to move in the directions perpendicular to the slide cam. In addition, each of the slide pawls is provided with a convex toothed portion.

When the rotational shaft is rotated to a locking position, the pawls are radially moved outward via the slide cam, so that the respective convex toothed portions of the pawls engage a concave toothed portion that is circumferentially formed over an inner circular surface of a peripheral edge of the first housing. In this state, the first housing is prevented from rotating relative to the second housing, so that the seat reclining device is locked. As a result, the seat back is locked in position relative to the seat cushion.

In the seat reclining device, the second housing (guide) is constructed to receive the first housing (ratchet) therein. That is, the first and second housings are respectively constructed such that a peripheral edges of the second housing can circumferentially encircle a peripheral edge of the first housing when they are mated or coupled to each other.

In order to assemble the seat reclining device using a manufacturing machine, first, the slide cam and the slide pawls are attached to the second housing (guide) that is disposed on the manufacturing machine. Thereafter, the first housing (ratchet) is placed on the second housing, so that the first and second housings are mated or coupled to each other. At this time, the peripheral edge of the first housing can be encircled by the peripheral edge of the second housing. Subsequently, the clip ring is placed on the first housing while a retainer portion of the clip ring contacts the first housing, so that the first and second housings are coupled to each other. The clip ring thus positioned is then fixed to the second housing by crimping, so that the first and second housings can be circumferentially fastened or clamped to each other.

However, in order to fix the clip ring to the second housing, the mated first and second housings must be turned over such that the second housing can be positioned above the first housing. This is because the second housing is positioned below the first housing when the first and second housings are coupled to each other in the manufacturing machine. This may lead to an increased number of steps of a manufacturing process of the seat reclining device.

SUMMARY OF THE INVENTION

For example, in one aspect of the present invention, a connecting device that is capable of rotatably connecting a first component and a second component of a vehicle seat may include first and second connecting elements that are axially oppositely coupled to each other so as to be rotatable relative to each other, a locking member that is positioned between the first and second connecting elements, an operating member that is positioned between the first and second connecting elements, and a retainer member that is arranged and constructed to circumferentially clamp the first and second connecting elements, thereby preventing the first and second connecting elements from being axially separated from each other. The locking member is radially movably attached to the second connecting element and has an outwardly-faced toothed portion. The outwardly-faced toothed portion is arranged and constructed to engage an inwardly-faced toothed portion formed in the first connecting element, thereby preventing the first and second connecting elements from rotating relative to each other. The operating member is arranged and constructed to radially move the locking member such that the outwardly-faced toothed portion of the locking member can be engaged with or disengaged from the inwardly-faced toothed portion of the first connecting element. The retainer member has a retainer portion and is fixed to the first connecting element while the second connecting element is axially supported by the retainer portion of the retainer member.

According to the connecting device thus constructed, in order to circumferentially fasten the first and second connecting elements using a manufacturing machine, the retainer member can be fixed to the first connecting element. Therefore, the coupled first and second connecting elements need not be turned over in order to fix the retainer member to the first connecting element. This is because the first connecting element is positioned above the second connecting element when the first and second connecting elements are coupled in the manufacturing machine. This may lead to a reduced number of steps in a manufacturing process of the connecting device.

Optionally, the retainer member can be fixed to the first connecting element by crimping.

Further, the first connecting element may have a support portion. The second connecting element may have an annular wall portion that is axially projected therefrom. The support portion of the first connecting element may be arranged and constructed to circumferentially encircle the annular wall portion of the second connecting element when the first and second connecting elements are coupled to each other.

Other objects, features and advantages of the present invention will be readily understood after reading the following detailed description together with the accompanying drawings and the claims.

DETAILED DESCRIPTION OF THE INVENTION

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

A detailed representative embodiment of the present invention will be described with reference FIGS. 1 to 12.

Figure 2:
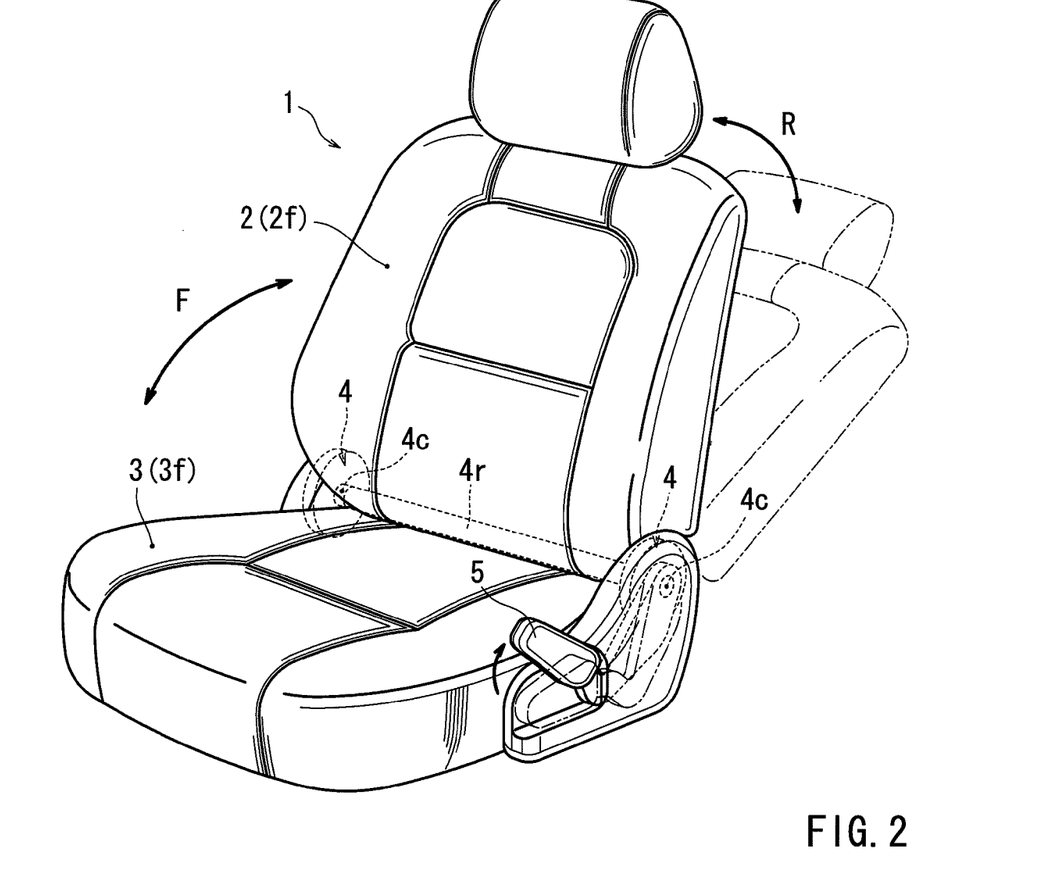
FIG. 2 is a perspective view of a vehicle seat having the reclining device.

As shown in FIG. 2, a representative vehicle seat 1 may preferably be arranged as a driver's seat of a vehicle and include a seat back 2 and a seat cushion 3. The seat back 2 and the seat cushion 3 are respectively connected by a pair of reclining devices 4 (connecting devices) that are disposed on both sides in their width direction.

The reclining devices 4 are respectively constructed so as to be switched between an unlocking condition in which a tilting angle of the seat back 2 can be adjusted and a locking condition in which the tilting angle can be fixedly maintained. Switching between the locking condition and the unlocking condition of the reclining devices 4 can be performed via rotation of operating shafts 4c that are respectively positioned at centers of the reclining devices 4. The operating shafts 4c are connected to an elongated connection member 4r that is disposed therebetween, so that their axial rotating motions can be mutually transmitted therebetween. Thus, the operating shafts 4c can be integrally axially rotated. As a result, the switching between the locking condition and the unlocking condition of the reclining devices 4 can be simultaneously or synchronously performed. Further, the reclining devices 4, in a normal condition in which the operating shafts 4c are not yet axially rotated, are biased so as to be maintained in the locking condition in which the tilting angle of the seat back 2 is fixed to a desired angle.

The reclining devices 4 can be simultaneously switched (unlocked) to the unlocking condition by lifting an operation lever 5. The operation lever 5 is attached to a side portion of the seat cushion 3 and is linked to the connection member 4r (the operating shafts 4c). When the reclining devices 4 are unlocked, as shown by solid and broken lines in FIG. 2, the seat back 2 can be tilted forwardly and backwardly, so that the tilting angle thereof can be adjusted. When the lever 5 is released after the tilting angle of the seat back 2 is adjusted, the reclining devices 4 are respectively returned to the locking condition, so that the tilting angle of the set back 2 can be fixedly maintained to an adjusted tilting angle.

The seat back 2 is normally biased forwardly via a biasing spring (not shown) that is disposed between the seat back 2 and the seat cushion 3. Therefore, when the reclining devices 4 are unlocked while a passenger does not sit on the vehicle seat 1, the seat back 2 can be automatically rotated forwardly, so as to be folded on the seat cushion 3.

Further, each of the reclining devices 4 has a lockable rotational region and an unlockable (free) rotational region. In the lockable rotational region, the reclining device 4 can be placed in the locking condition when the lever 5 is released. Conversely, in the unlockable rotational region, the reclining device 4 cannot be placed in the locking condition even when the lever 5 is released.

Generally, the lockable rotational region of the reclining device 4 may preferably be determined so as to correspond to a rotational range between a normal position (a substantially vertical position) and a farthest rearward rotational position of the seat back 2 (i.e., a rearward rotational range of the seat back 2 shown by a two-headed arrow R in FIG. 2). Conversely, the unlockable rotational region of the reclining device 4 may preferably be determined so as to correspond to a rotational range between the normal position and a farthest forward rotational position (a folded position) of the seat back 2 (i.e., a forward rotational range of the seat back 2 shown by a two-headed arrow F in FIG. 2).

Therefore, when the reclining devices 4 are unlocked by lifting the lever 5 while the seat back 2 is in the substantially vertical position (e.g., a position shown by solid lines in FIG. 2), the seat back 2 can be automatically rotated forwardly by a biasing force of the biasing spring until it is folded on the seat cushion 3 even when the lever 5 is released. Conversely, after the reclining devices 4 are unlocked by lifting the lever 5 while the seat back 2 is in the substantially vertical position, when the seat back 2 is rotated rearwardly against the biasing force of the biasing spring so as to adjust the tilting angle thereof, the tilting angle of the seat back 2 can be fixed to the adjusted tilting angle by releasing the lever 5.

As will be appreciated, the reclining devices 4 respectively have the substantially same construction as each other with the exception of one aspect that they are formed so as to be exactly opposite to each other. Therefore, the reclining device 4 that is disposed on the left side of the vehicle seat 1 (which correspond to the right side in FIG. 2) will be described hereinafter.

Figure 1:
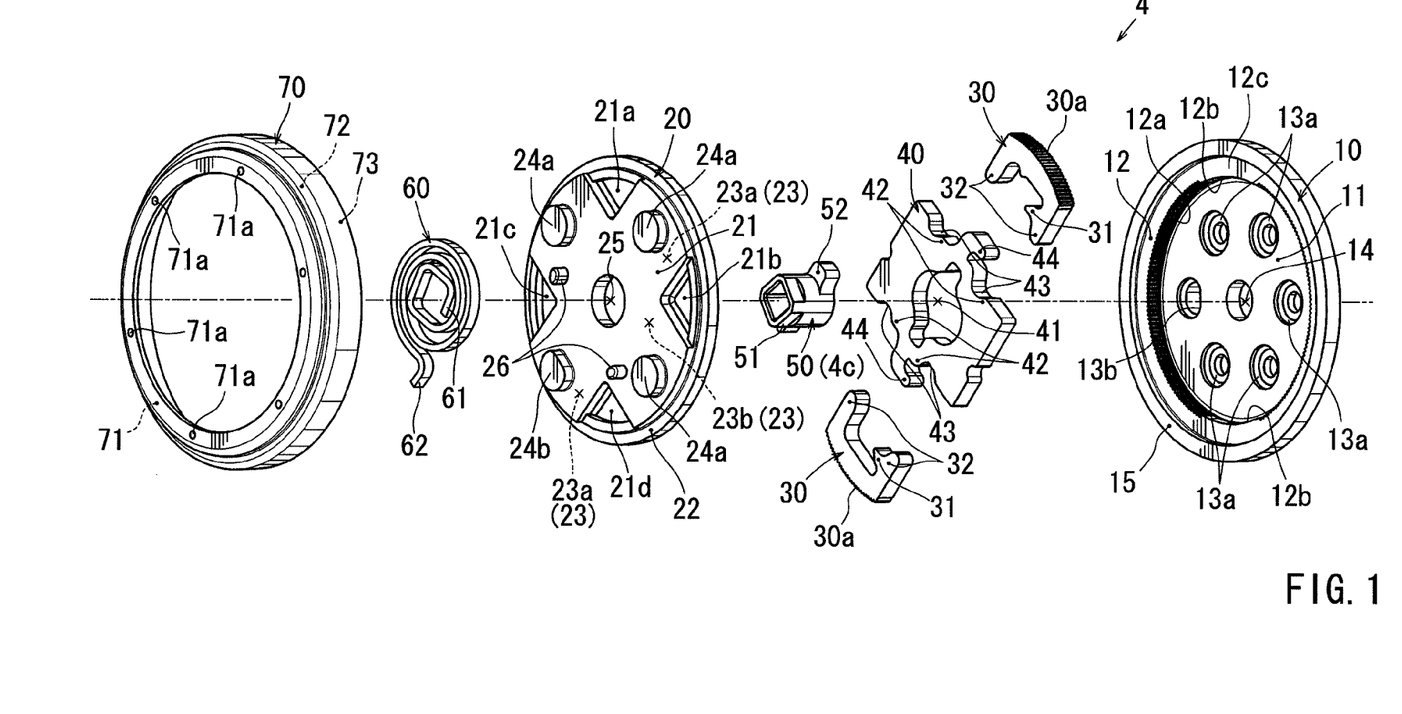
FIG. 1 is an exploded perspective view of a reclining device according to a representative embodiment of the present invention.

As shown in FIG. 1, the reclining device 4 includes an outer shell that is constructed from a pair of opposing dish-shaped housings, i.e., a first or rotational housing 10 (a ratchet or a first connecting element) and a second or stationary housing 20 (a guide or a second connecting element). The first and second housings 10 and 20 are axially oppositely mated or coupled to each other and are relatively rotatably fastened or clamped by a clip ring 70 (a retainer member) that is circumferentially attached thereto (FIG. 5).

The first housing 10 is constructed to be affixed to a back frame 2f (a first component) of the seat back 2. Conversely, the second housing 20 is constructed to be affixed to a cushion frame 3f (a second component) of the seat cushion 3. The first and second housings 10 and 20, when coupled to each other, define an inner receiving space therebetween that is capable of receiving a slide cam 40 (an operating member), a pair of slide pawls 30 (locking members), an operating member 50 (a hinge cam) and a spirally shaped spring 60 therein.

Figure 5:
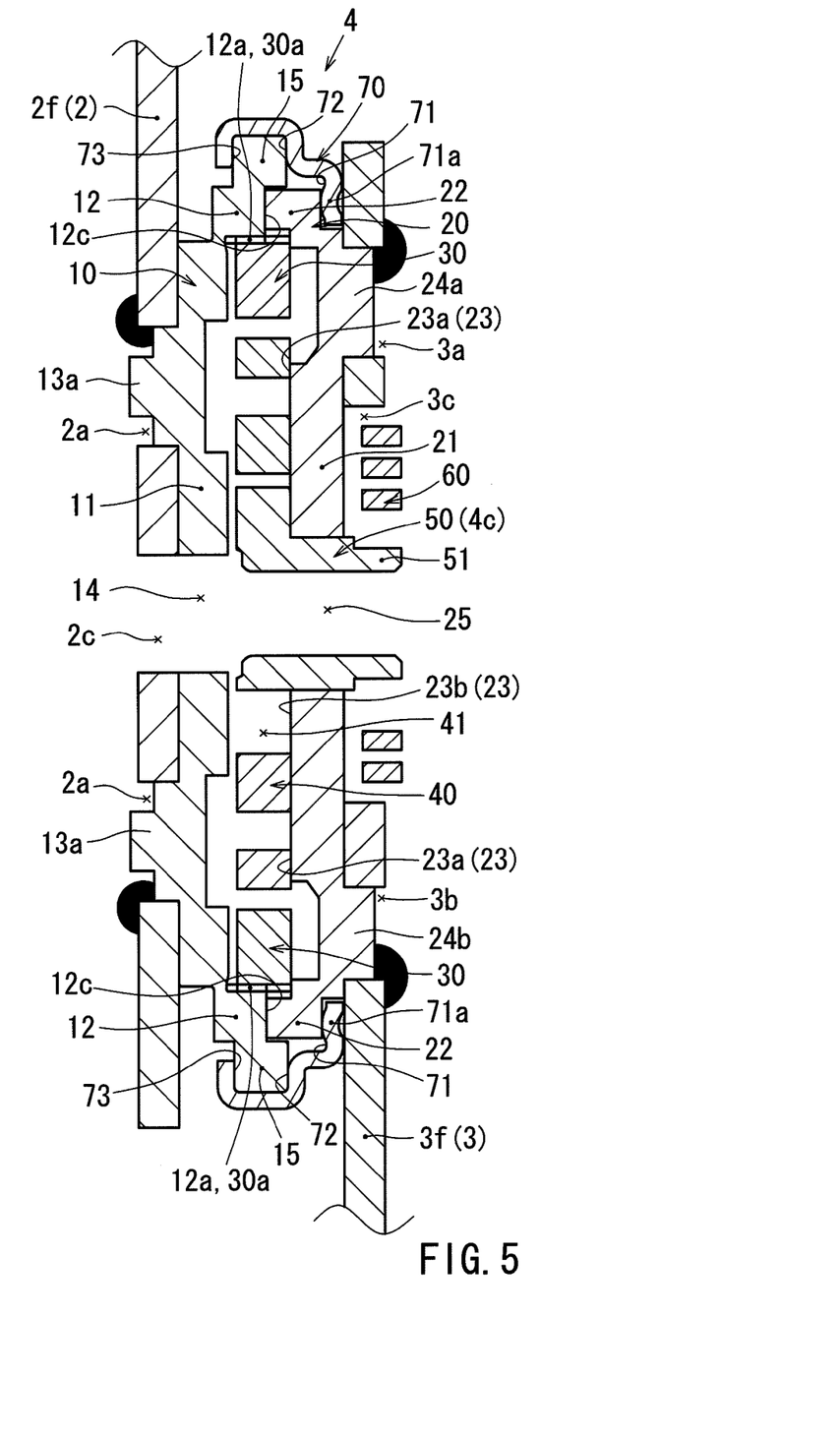
FIG. 5 is an enlarged cross-sectional view taken along line V-V in FIG. 4.

In particular, as best shown in FIGS. 1 and 5, the first housing 10 has a disk-shaped base portion 11, a annular wall portion 12 and an enlarged annular flanged portion 15 (a support portion). The annular wall portion 12 is axially projected from a circumferential periphery of the base portion 11 along a rotational axis of the first housing 10. The flanged portion 15 is radially outwardly projected from the wall portion 12 such that an annular shoulder portion 12c can be formed therebetween. Thus, the first housing 10 has a circular shouldered recess therein. Further, the first housing 10 may preferably be formed by half die cutting a circular sheet material or sheet blank (not shown).

Figure 6:
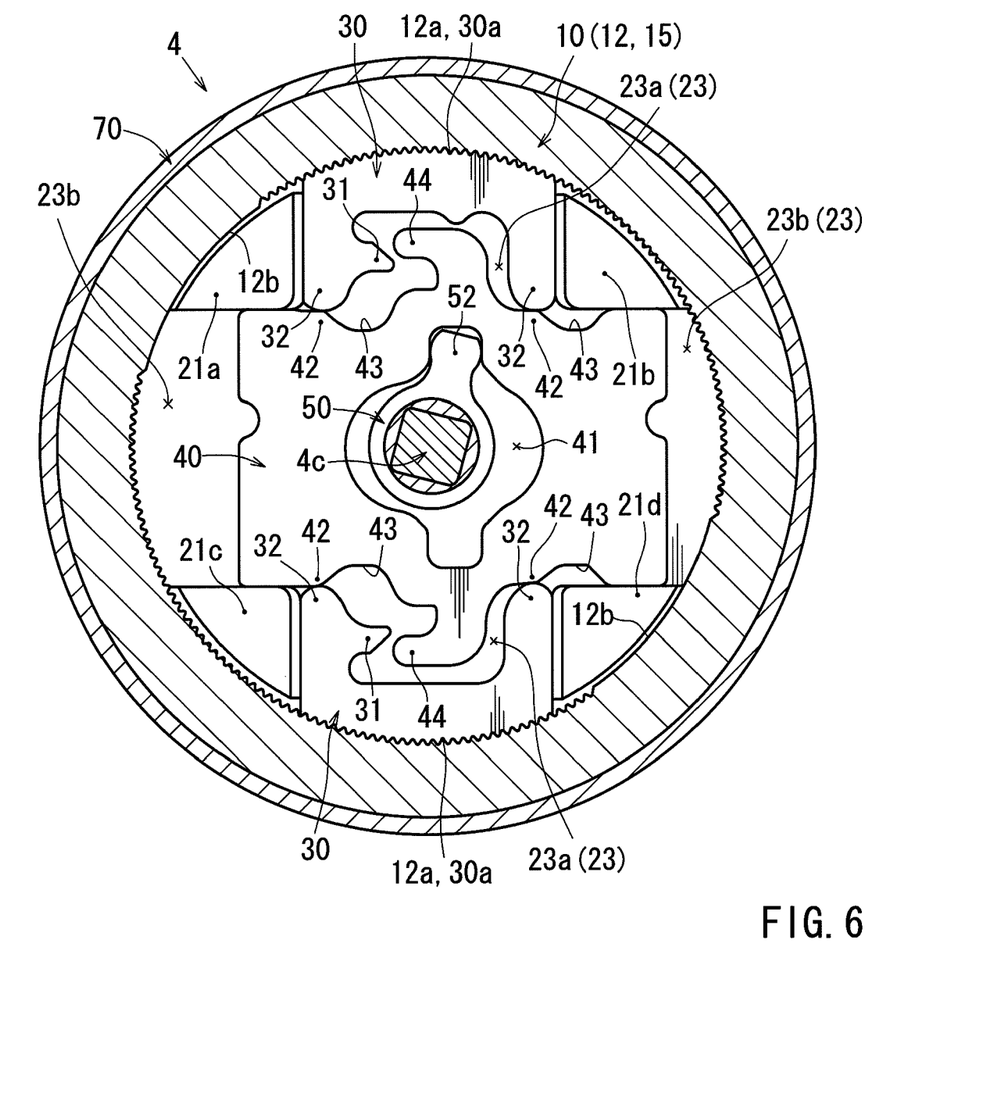
FIG. 6 is an enlarged cross-sectional view taken along line VI-VI in FIG. 3, which illustrates a condition in which the reclining device is locked.
Figure 7:
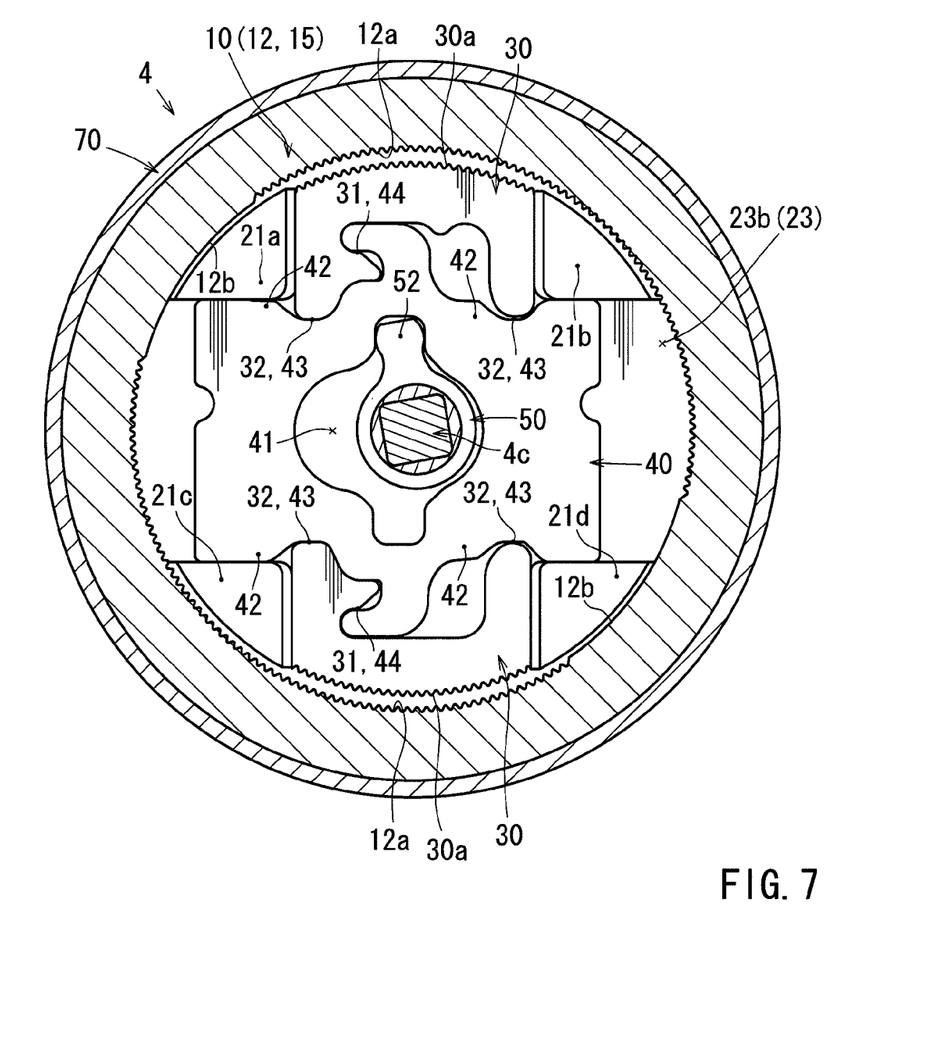
FIG. 7 is an enlarged cross-sectional view similar to FIG. 6, which illustrates a condition in which the reclining device is unlocked.

As shown in FIGS. 1, 6 and 7, the annular wall portion 12 of the first housing 10 includes inwardly-faced toothed portions 12a and non-toothed portions 12b. These portions 12a and 12b are formed in an inner circumferential surface of the wall portion 12. However, the non-toothed portions 12b may preferably be protruded inwardly than the toothed portions 12a. The non-toothed portions 12b are positioned in two locations of the inner circumferential surface of the wall portion 12. The two locations are angularly spaced apart 180 degrees, so that the toothed portions 12a are circumferentially spaced apart by the non-toothed portions 12b. As will be recognized, the toothed portions 12a can define the lockable rotational region of the reclining devices 4. Conversely, the non-toothed portions 12b can define the unlockable rotational region of the reclining devices 4.

Figure 3:
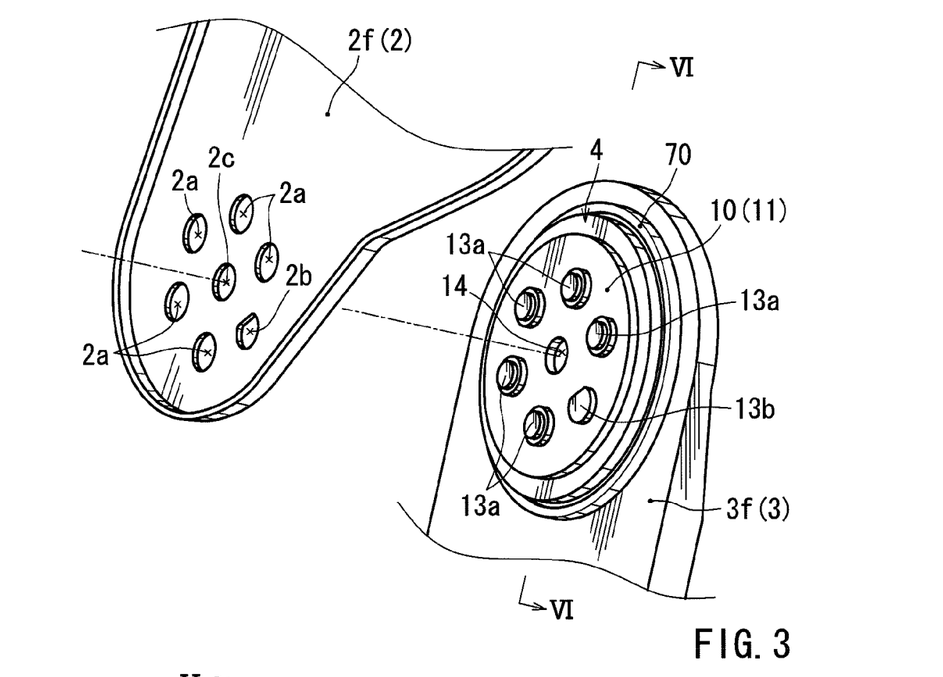
FIG. 3 is an enlarged perspective view of the reclining device that is attached to a back frame and a cushion frame.

As shown in, for example, FIGS. 1 and 3, the first housing 10 has a receiving opening 14 that passes through a central portion of the base portion 11 thereof. The receiving opening 14 is shaped such that the operating shaft 4c can be inserted therethrough. Further, the first housing 10 has a plurality of circular engagement projections or dwells 13a and a D-shaped engagement projection or dwell 13b. The dwells 13a and 13b are respectively formed in the base portion 11 so as to be projected in a direction opposite to the wall portion 12 formed in the base portion 11. The dwells 13a and 13b may preferably be positioned along the circumferential periphery of the base portion 11 at equal intervals.

Further, as best shown in FIG. 3, the receiving opening 14 and the dwells 13a and 13b may preferably be positioned so as to correspond a through hole 2c and a plurality of circular dwell insertion holes 2a and a D-shaped dwell insertion hole 2b that are respectively formed in the back frame 2f. Therefore, the first housing 10 can be attached to the back frame 2f by fitting the dwells 13a and 13b into the dwell insertion holes 2a and 2b. At this time, the receiving opening 14 can be aligned with the through hole 2c. Further, the first housing 10 may preferably be affixed to the back frame 2f by welding.

Conversely, as best shown in FIGS. 1 and 5, the second housing 20 has a disk-shaped base portion 21 and an annular wall portion 22. The wall portion 22 is axially projected from a circumferential periphery of the base portion 21 along the rotational axis of the first housing 10 in a direction opposite to the wall portion 12 of the first housing 10. Further, similar to the first housing 10, the second housing 20 may preferably be formed by half die cutting a circular sheet material or sheet blank (not shown).

As shown in FIG. 5, the annular wall portion 22 of the second housing 20 is shaped so as to be loosely fit within the flanged portion 15 of the first housing 10 while an inner surface of the wall portion 22 contacts an annular shoulder portion 12c formed in the first housing 10 when the first and second housings 10 and 20 are axially mated or coupled to each other. Thus, the first and second housings 10 and 20 can be coupled to each other while the wall portion 22 of the second housing 20 is loosely encircled by the flanged portion 15 of the first housing 10. That is, the first and second housings 10 and 20 can be coupled to each other so as to be slidably rotatable relative to each other.

As shown in FIG. 5, the wall portion 22 of the second housing 20 may preferably have an inner diameter greater than the inner diameter of the wall portion 12 of the first housing 10

Figure 4:
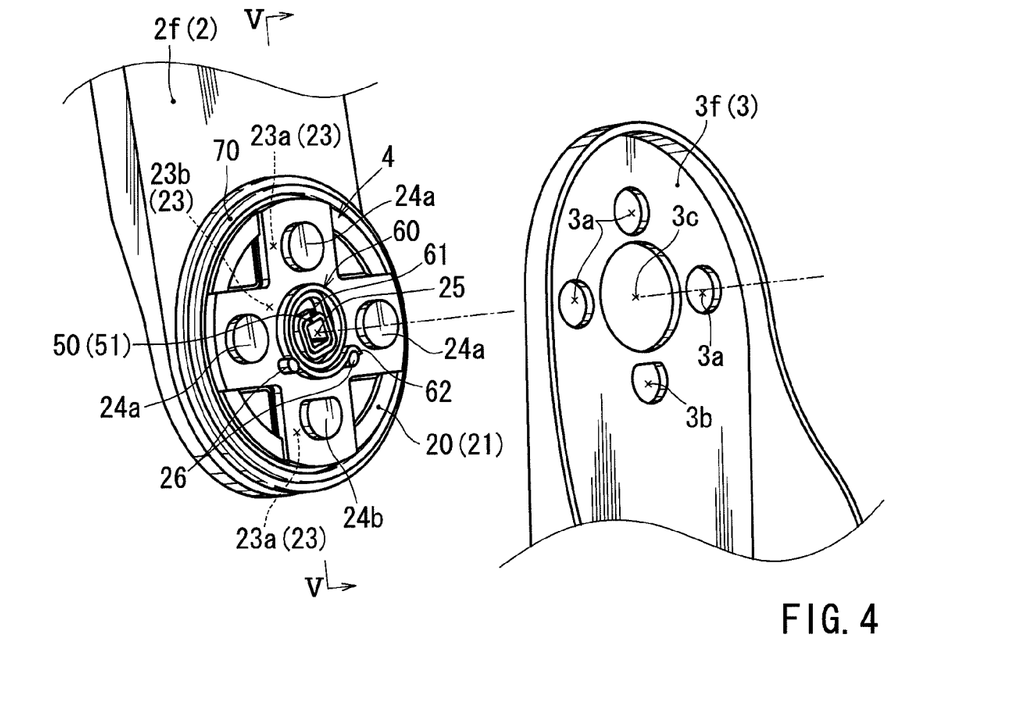
FIG. 4 is an enlarged perspective view of the reclining device that is attached to the back frame and the cushion frame, which is viewed from a different direction.

As shown in, for example, FIGS. 1 and 4, the second housing 20 has a receiving opening 25 that passes through a central portion of the base portion 21 thereof. The receiving opening 25 is positioned so as to be axially aligned with the receiving opening 14 of the first housing 10 when the first and second housings 10 and 20 are oppositely coupled to each other. The receiving opening 25 is shaped such that the operating shaft 4c can be inserted therethrough. Further, the second housing 20 has a plurality of circular engagement projections or dwells 24a and a D-shaped engagement projection or dwell 24b. The dwells 24a and 24b are respectively formed in the base portion 21 so as to be projected in a direction opposite to the wall portion 22 formed in the base portion 21. The dwells 24a and 24b may preferably be positioned along the circumferential periphery of the base portion 21 at equal intervals.

Further, as best shown in FIG. 4, the receiving opening 25 and the dwells 24a and 24b may preferably be positioned so as to correspond an enlarged through hole 3c and a plurality of circular dwell insertion holes 3a and a D-shaped dwell insertion hole 3b that are respectively formed in the cushion frame 3f. Therefore, the second housing 20 can be attached to the cushion frame 3f by fitting the dwells 24a and 24b into the dwell insertion holes 3a and 3b. At this time, the receiving opening 25 can be aligned with the through hole 3c. Further, the second housing 20 may preferably be affixed to the cushion frame 3f by welding.

As shown in FIGS. 1, 6 and 7, the second housing 20 has an inner circular recessed portion in which a cross-shaped guide groove 23 defined by four guide portions 21a-21d is formed. As shown in FIG. 1, the guide groove 23 may preferably be formed by depressing the base portion 21 of the second housing 20. The cross-shaped guide groove 23 may preferably include guide groove portions 23a and 23b are formed so as to perpendicularly extend vertically and horizontally. The guide groove portions 23a and 23b will respectively be referred to as pawl guide grooves 23a and cam guide grooves 23b hereinafter. As shown in FIGS. 6 and 7, the slide pawls 30 are disposed in the pawl guide grooves 23a so as to be radially vertically slidable therealong. Conversely, the slide cam 40 is disposed in the cam guide grooves 23b so as to be radially laterally slidable therealong.

As shown in FIGS. 1, 6 and 7, the slide cam 40 is a plate having substantially a rectangular shape and is shaped so as to be slidably received in the cam guide grooves 23b formed in the second housing 20. The slide cam 40 is axisymmetrically shaped and has hook-shaped engagement projections 44 that radially project from the central portions of opposite longer sides thereof. Also, the slide cam 40 has shoulder portions 42 and recessed portions 43 that are respectively formed in the opposite longer sides. The shoulder portions 42 and the recessed portions 43 are respectively positioned on both sides of the engagement projections 44. The slide cam 40 includes a centrally located bore 41 that can receive the operating member 50.

As shown in FIGS. 1, 6 and 7, both of the slide pawls 30 are plate members that have the same shape as each other with the exception of one aspect that they are formed so as to be exactly opposite to each other. The slide pawls 30 are respectively shaped so as to be slidably received in the pawl guide grooves 23a formed in the second housing 20. Each slide pawl 30 has an outwardly-faced toothed portion 30a that can engage the toothed portion 12a of the first housing 10. The toothed portion 30a is formed in an arcuate outer periphery of the slide pawl 30, so as to engage the toothed portion 12a when the pawl 30 moves radially outwardly along the pawl guide grooves 23a. The slide pawl 30 has a pair of right and left contact portions 32. The contact portions 32 are formed in an inner periphery of the slide pawl 30. Also, the slide pawl 30 has an engagement projection 31 that is positioned between the contact portions 32.

The operating member 50 includes a (non-circular) cylindrical shaft portion 51 and an arm portion 52 that outwardly projects from a circumferential surface of shaft portion 51. The arm portion 52 engages a part of the bore 41 of the slide cam 40 (FIGS. 6 and 7). A part of the cylindrical shaft portion 51 is positioned in the receiving opening 25 of the second housing 20. The operating shaft 4c is inserted into the cylindrical shaft portion 51 of the operating member 50. An inner circumferential surface of the cylindrical shaft portion 51 and an outer circumferential surface of the operating shaft 4c may preferably be shaped so as to permit transmission of rotational motion therebetween. That is, the cylindrical shaft portion 51 is shaped so as to be rotatable with the operating shaft 4c. Further, the operating shafts 4c is capable of rotating clockwise in FIGS. 1 and 4 when the operation lever 5 is lifted. Therefore, the cylindrical shaft portion 51 (the arm portion 52) is capable of rotating clockwise in FIGS. 1 and 4 when the operation lever 5 is lifted.

As represented in FIGS. 1 and 4, the spring 60 has a spiral shape as described above and functions as a torsion spring between the second housing 20 and the operating member 50. That is, an inner end 61 of the spring 60 is connected to the outer circumferential surface of the cylindrical shaft portion 51. Conversely, the outer end 62 of the spring 60 is connected to one of engagement projections 26 formed in the base portion 21 of the second housing 20. Thus, the operating member 50 is biased counterclockwise in FIGS. 1 and 4 with respect to the second housing 20 by a force of the spring 60.

As shown in FIG. 1, the clip ring 70 is a shouldered annular steel ring and has a first annular support wall 71 (a retainer portion), a second enlarged annular support wall 72 and a foldable annular periphery 73 (a fixing portion). Further, formed in the first support wall 71 are a plurality of projections 71a that are projected inwardly therefrom. The projections 71a may preferably be positioned at equal intervals along the first support wall 71.

After the pawls 30, the slide cam 40, the operating member 50 and the spring 60 are attached to the second housing 20, the first and second housings 10 and 20 are axially mated or coupled to each other while the annular wall portion 22 of the second housing 20 is fitted within the flanged portion 15 of the first housing 10. As shown in FIG. 5, the first and second housings 10 and 20 thus coupled are circumferentially clamped or fastened via the clip ring 70, so as to be prevented from being axially separated from each other. In particular, the clip ring 70 is positioned such that the first wall 71 (the projections 71a) and the second wall 72 respectively contact an outer surface of the annular wall portion 22 of the second housing 20 and an inner surface of the flanged portion 15 of the first housing 10. Thereafter, the foldable periphery 73 of the clip ring 70 is crimped so as to be folded over the flanged portion 15 of the first housing 10. As a result, the clip ring 70 is fixed to the first housing 10 while the second housing 20 is axially supported by the first wall 71 of the clip ring 70, so that the first and second housings 10 and 20 can be fastened. Thus, the reclining device 4 can be assembled.

Further, the clip ring 70 (the foldable periphery 73) may preferably be crimped such that the first and second housings 10 and 20 are relatively rotatable to each other. Further, the first wall 71 of the clip ring 70 can contact the annular wall portion 22 of the second housing 20 via the projections 71a. This may lead to reduced sliding friction produced between the clip ring 70 and the second housing 20.

As shown in FIGS. 3 and 4, the reclining device 4 thus assembled is connected to the back frame 2f and the cushion frame 3f while the operating shaft 4c is passed therethrough. In particular, the first housing 10 is attached to the back frame 2f by fitting the dwells 13a and 13b into the dwell insertion holes 2a and 2b. At the same time, the second housing 20 is attached to the cushion frame 3f by fitting the dwells 24a and 24b into the dwell insertion holes 3a and 3b. Similarly, the reclining device 4 that is disposed on the right side of the vehicle seat 1 is connected to the back frame 2f and the cushion frame 3f. Thus, the back frame 2f and the cushion frame 3f (the seat back 2 and the seat cushion 3) are respectively connected by the two reclining devices 4

Operation of the reclining device 4 will now be described with reference to FIGS. 6 and 7. Further, each of FIGS. 6 and 7 illustrates a condition in which the reclining device 4 is in the lockable rotational region. In particular, each of FIGS. 6 and 7 illustrates a condition when the seat back 2 is in the substantially farthest rearward rotational position (i.e., a rotational position shown by broken lines in FIG. 2.

As shown in FIG. 6, when the reclining device 4 is connected to the back frame 2f and the cushion frame 3f, the slide cam 40 is slidably received in the cam guide grooves 23b of the second housing 20. Conversely, the slide pawls 30 are respectively slidably received in the pawl guide grooves 23a of the second housing 20 while they are prevented from moving in a circumferential direction of the second housing 20. Further, the operating member 50 is biased clockwise in FIG. 6 (counterclockwise in FIGS. 1 and 4) by the force of the spring 60. Thus, the slide cam 40 is applied with an actuating force in a rightward direction in FIG. 6 via the arm portion 52 of the operating member 50, so as to be moved to a rightmost position thereof. At this time, the shoulder portions 42 of the slide cam 40 respectively contact or engage the contact portions 32 of the slide pawls 30, so that the slide pawls 30 are respectively radially outwardly moved to outermost positions thereof. As a result, the toothed portions 30a of the slide pawls 30 engage the toothed portions 12a of the first housing 10.

Thus, the reclining device 4 can be maintained in the locking condition (FIG. 6). As a result, the seat back 2 can be maintained in the substantially rotational position shown by broken lines in FIG. 2. Further, at this time, the engagement projections 44 of the slide cam 40 are respectively positioned opposite to the engagement projections 31 of the slide pawls 30 while they are laterally spaced from the engagement projections 31.

When the operating shaft 4c is rotated about its axis by operating (lifting) the operation lever 5 in order to adjust the tilting angle of the seat back 2, the operating member 50 moves counterclockwise in FIG. 6 against the force of the spring 60. At this time, the slide cam 40 is applied with an actuating force in a leftward direction in FIG. 6 via the arm portion 52 of the operating member 50. Thus, the slide cam 40 is applied with an actuating force in a leftward direction in FIG. 6 via the arm portion 52 of the operating member 50, so as to be moved to a leftmost position thereof (FIG. 7). As a result, as shown in FIG. 7, the shoulder portions 42 of the slide cam 40 are respectively disengaged from the contact portions 32 of the slide pawls 30. At the same time, the engagement projections 44 of the slide cam 40 respectively engage the engagement projections 31 of the slide pawls 30, so that the slide pawls 30 are respectively radially inwardly moved to innermost positions thereof while the contact portions 32 of the slide pawls 30 are introduced into the recessed portions 43 of the slide cam 40. As a result, the toothed portions 30a of the slide pawls 30 are respectively disengaged from the toothed portions 12a of the first housing 10. Thus, the reclining device 4 can be switched to the unlocking condition (FIG. 7). Therefore, the seat back 2 can be rotated within the rearward rotational range R thereof (which range corresponds to the lockable rotational region of the reclining device 4), so that the tilting angle thereof can be adjusted.

When the lever 5 is released after the tilting angle of the seat back 2 is adjusted, the slide cam 40 is moved to the rightmost position. As a result, the toothed portions 30a of the slide pawls 30 engage the toothed portions 12a of the first housing 10 again, so that the reclining device 4 can be returned to the locking condition. Thus, the tilting angle of the set back 2 can be fixed to an adjusted tilting angle.

Further, when the seat back 2 is rotated into the forward rotational range F thereof (which range corresponds to the unlockable rotational region of the reclining device 4) beyond the normal position thereof, the slide cam 40 is moved to the rightmost position by releasing the lever 5. However, the toothed portions 30a of the slide pawls 30 contact the non-toothed portions 12b of the first housing 10 without engaging the toothed portions 12a of the first housing 10, so that the reclining device 4 can be maintained in the unlocking condition. As a result, the seat back 2 can be automatically folded on the seat cushion 3.

Next, a representative manufacturing process of the reclining device 4 will be described with reference to FIGS. 8-12. In order to manufacture the reclining device 4, a manufacturing machine (not shown) having a jig or lack J is used. The rack J has an open-topped box-shape and includes an annular support wall that is capable of receiving the first support wall 71 of the clip ring 70. Further, the annular support wall has an annular support surface Ja that is capable of supporting the second support wall 72 of the clip ring 70 from below.

Figure 8:
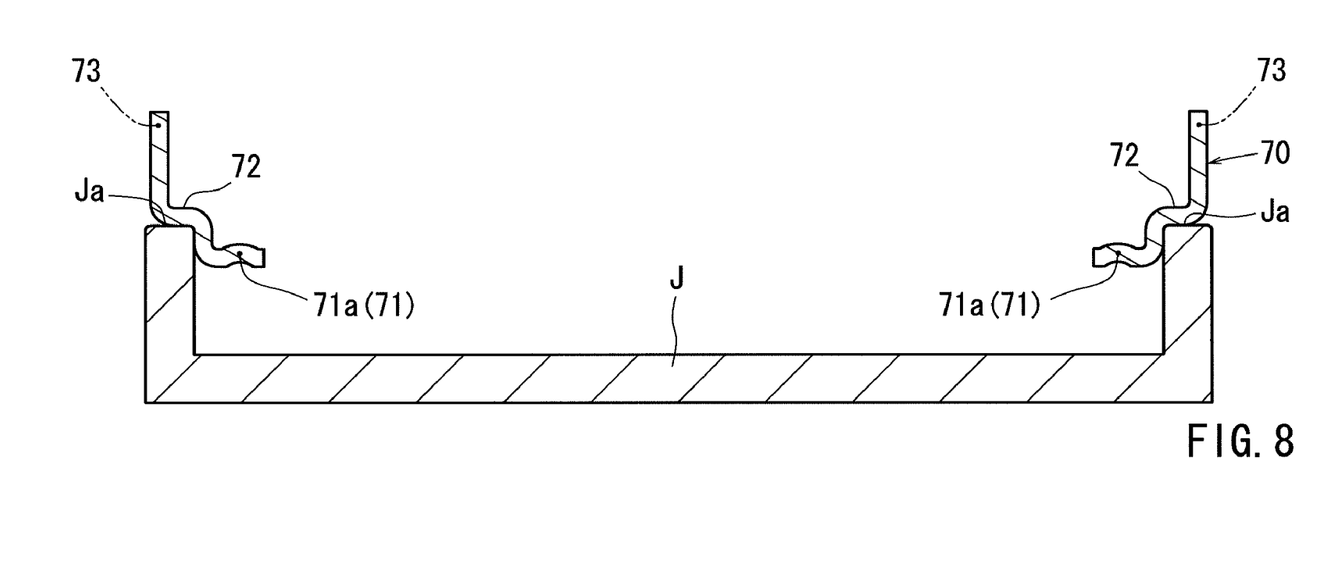
FIG. 8 is an enlarged cross-sectional view, which illustrates a process for manufacturing the reclining device.
Figure 9:
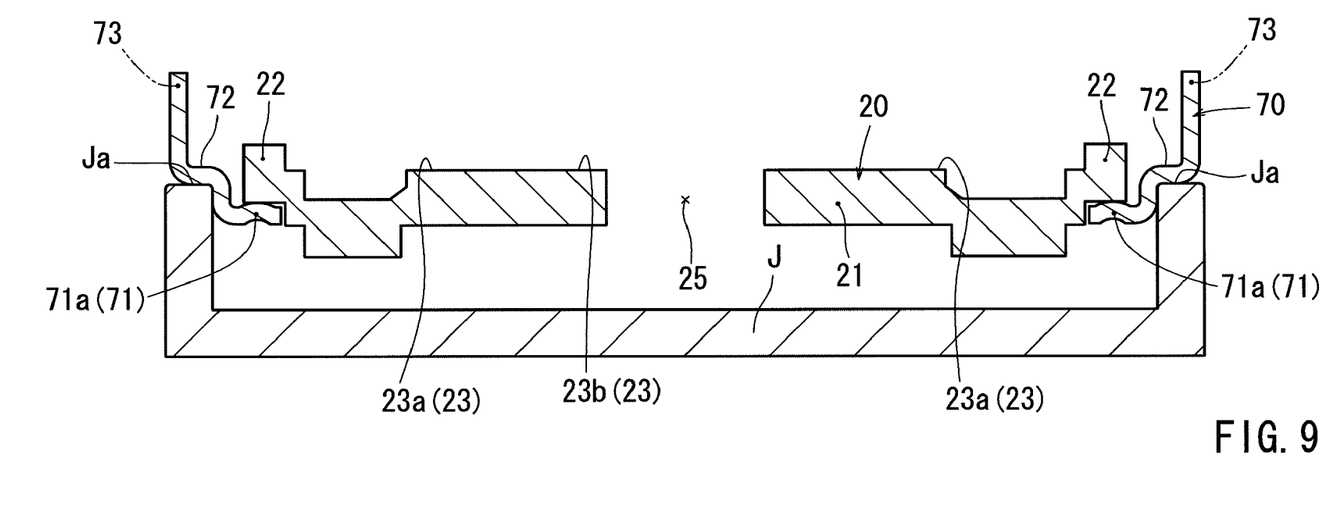
FIG. 9 is an enlarged cross-sectional view, which illustrates the process for manufacturing the reclining device.
Figure 10:
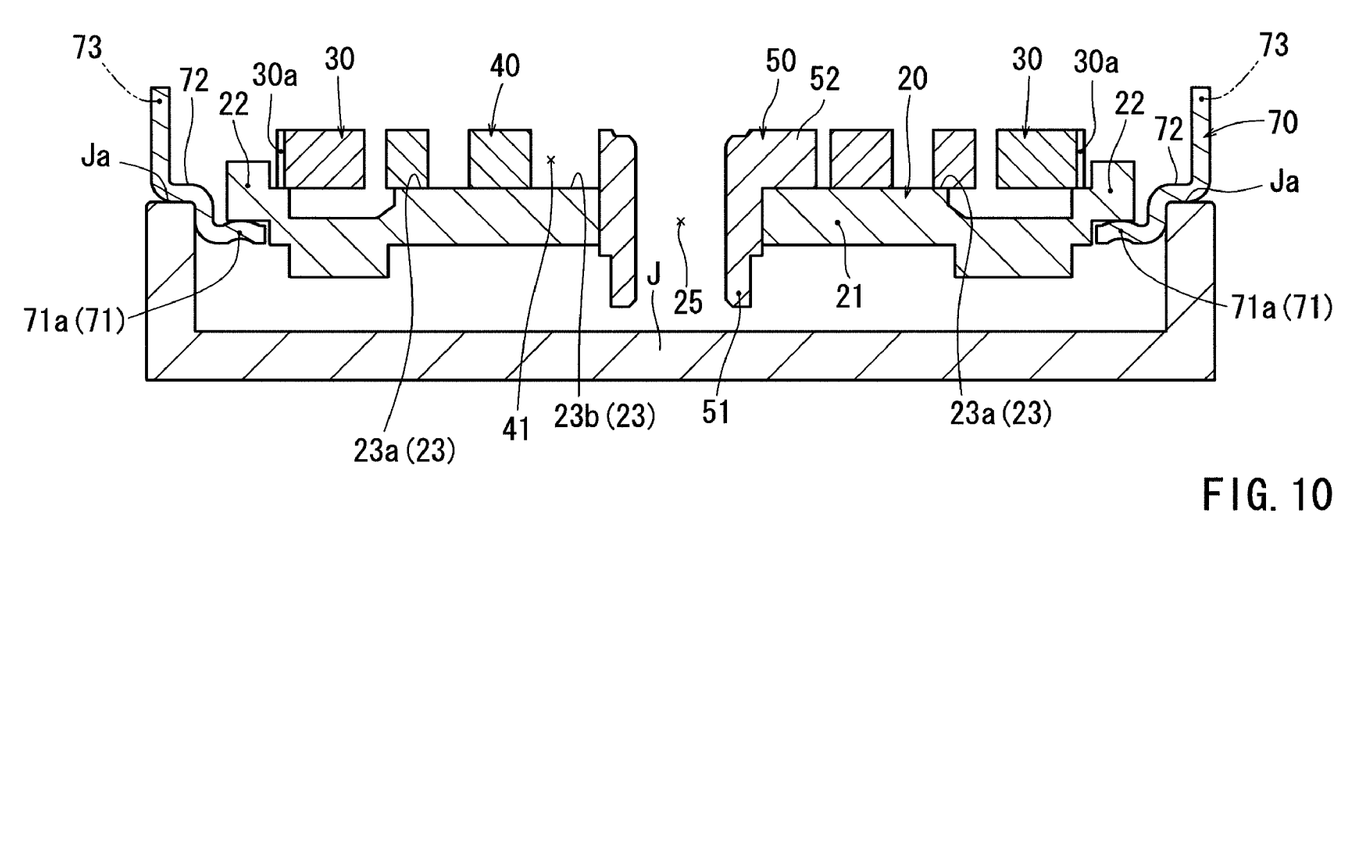
FIG. 10 is an enlarged cross-sectional view, which illustrates the process for manufacturing the reclining device.

First, as shown in FIG. 8, the clip ring 70 is disposed on the lack J such that the second support wall 72 is seated on the support surface Ja while the first support wall 71 is received within the annular support wall of the lack J. Thereafter, as shown in FIG. 9, the second housing 20 is disposed on the clip ring 70 such that the outer surface of the annular wall portion 22 contacts the first wall 71 (the projections 71a) of the clip ring 70. Subsequently, as shown in FIG. 10, the pawls 30 are respectively fitted into the pawl guide grooves 23a of the second housing 20. Also, the slide cam 40 is fitted into the cam guide grooves 23b of the second housing 20. Further, the operating member 50 is attached to the second housing 20 while the cylindrical shaft portion 51 and the arm portion 52 are respectively positioned in the receiving opening 25 of the second housing 20 and the bore 41 of the slide cam 40.

Figure 11:
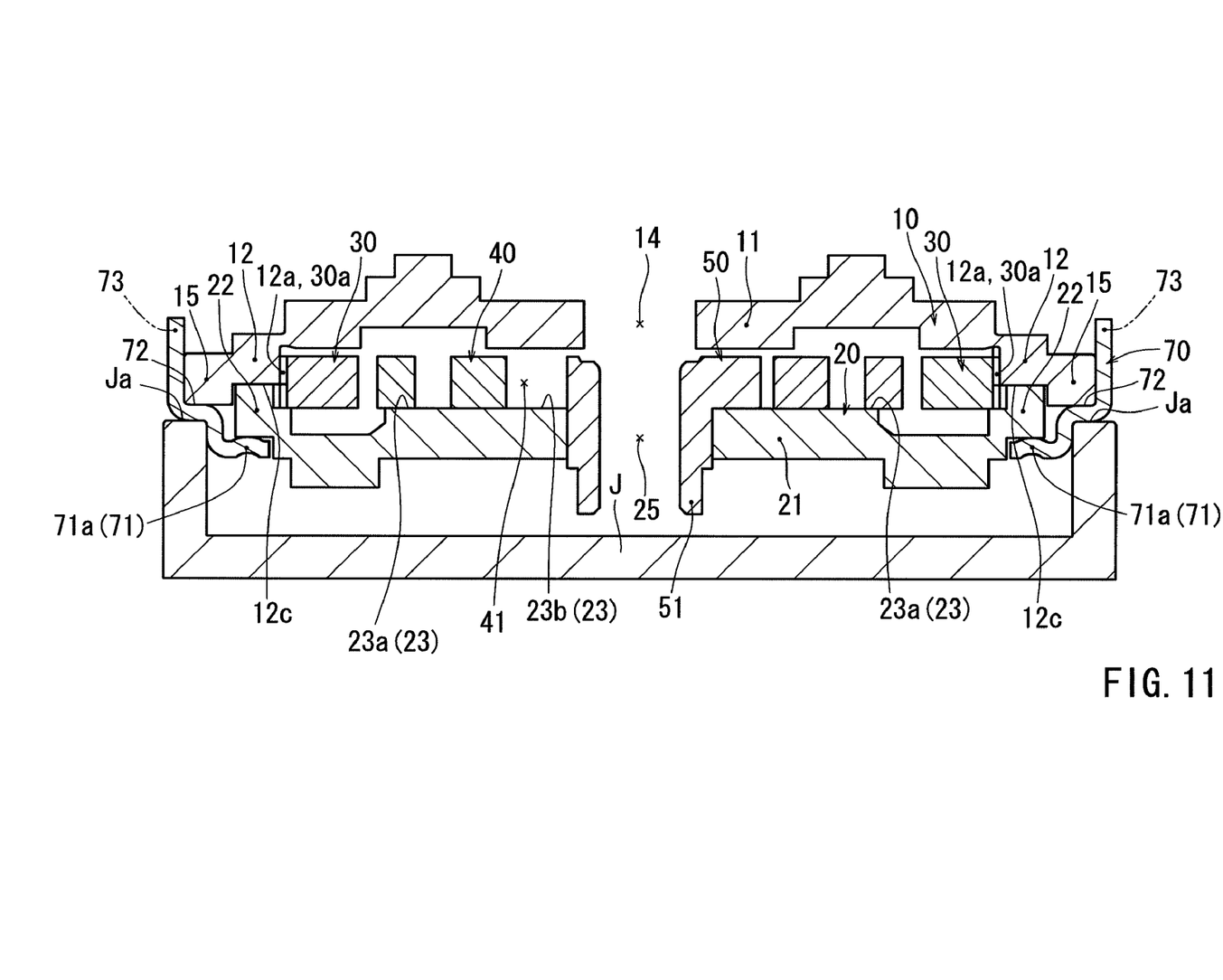
FIG. 11 is an enlarged cross-sectional view, which illustrates the process for manufacturing the reclining device.

Thereafter, as shown in FIG. 11, the first housing 10 is disposed on (coupled to) the second housing 20 such that the inner surface of the flanged portion 15 is seated on the second support wall 72 of the clip ring 70. At this time, the annular shoulder portion 12c formed in the first housing 10 contacts the inner surface of the wall portion 22 of the second housing 20 while the flanged portion 15 of the first housing 10 circumferentially encircles the wall portion 22 of the second housing 20.

Figure 12:
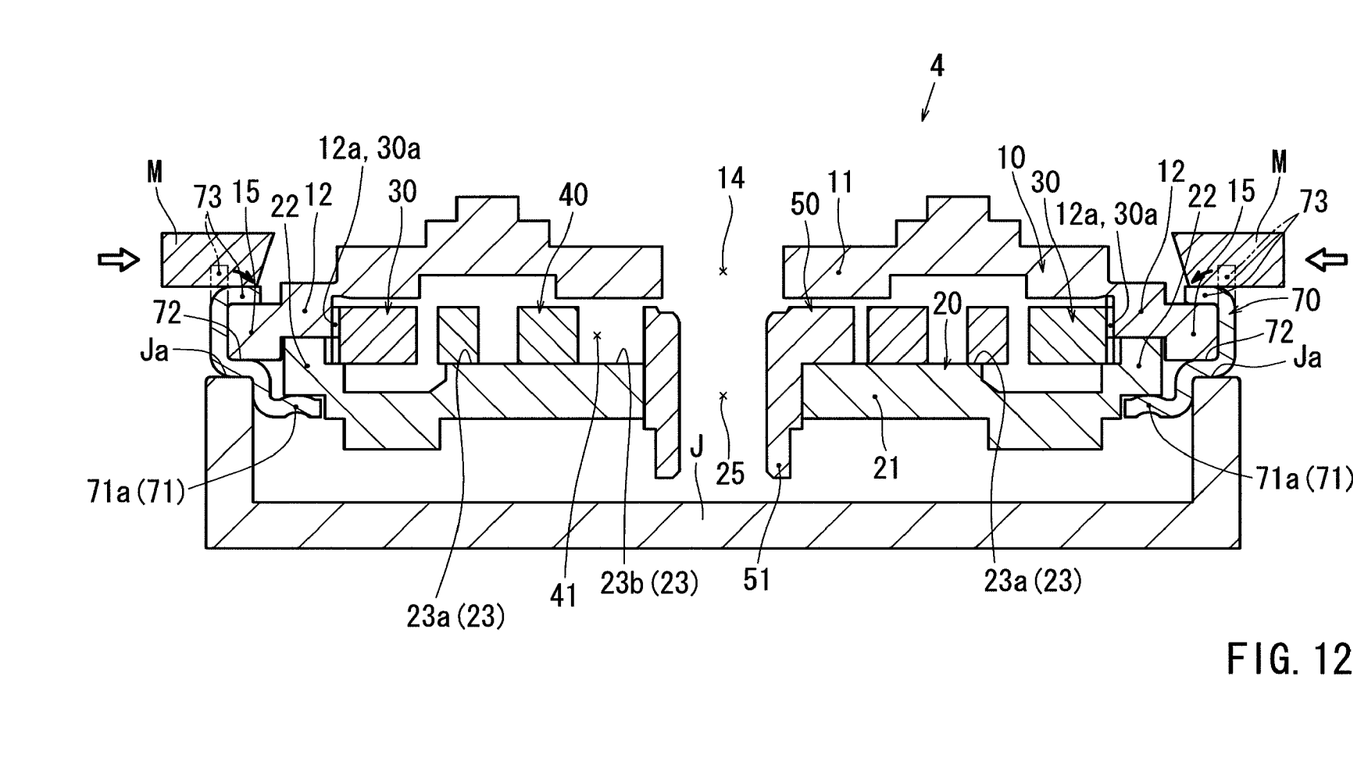
FIG. 12 is an enlarged cross-sectional view, which illustrates the process for manufacturing the reclining device.

Finally, as shown in FIG. 12, the foldable periphery 73 of the clip ring 70 is radially crimped by a crimping die M of the manufacturing machine. Further, at this time, the foldable periphery 73 of the clip ring 70 can be folded over the flanged portion 15 of the first housing 10 because the flanged portion 15 of the first housing 10 is radially outwardly positioned relative to the wall portion 22 of the second housing 20. As a result, the clip ring 70 is fixed to the first housing 10 while the second housing 20 is axially supported by the first wall 71 of the clip ring 70. Thus, the reclining device 4 can be manufactured.

According to the reclining device 4, in order to fasten the first and second housings 10 and 20, the clip ring 70 can be fixed to the first housing 10 and not to the second housing 20. Therefore, the clip ring 70 can be fixed to the first housing 10 without turning over the coupled first and second housings 10 and 20 because the first housing 10 is positioned above the second housing 20 when the first and second housings 10 and 20 are coupled to each other on the lack J of the manufacturing machine. This may lead to a reduced number of steps of the manufacturing process of the reclining device 4.

In addition, according to the reclining device 4, the foldable periphery 73 of the clip ring 70 can be crimped while the second support wall 72 is supported by the support surface Ja of the lack J of the manufacturing machine. Therefore, the clip ring 70 can be highly accurately crimped.

Further, the first and second housings 10 and 20 are coupled to each other while the second housing 20 (the annular wall portion 22) is received within the flanged portion 15 of the first housing 10. Therefore, the second housing 20 can be accurately positioned axially and radially with respect to the first housing 10.

Naturally, various changes and modifications may be made to the present invention without departing from the scope of the invention. For example, the reclining devices 4 can be used to connect the seat back 2 to a vehicle floor (not shown) and not the seat cushion 3. Further, the reclining devices 4 can be used to rotatably connect the vehicle seat 1 (the seat cushion 3) to the vehicle floor. Further, the reclining devices 4 can be used to rotatably connect an ottoman (not shown) to the seat cushion 3 or the vehicle floor.

Figure 13:
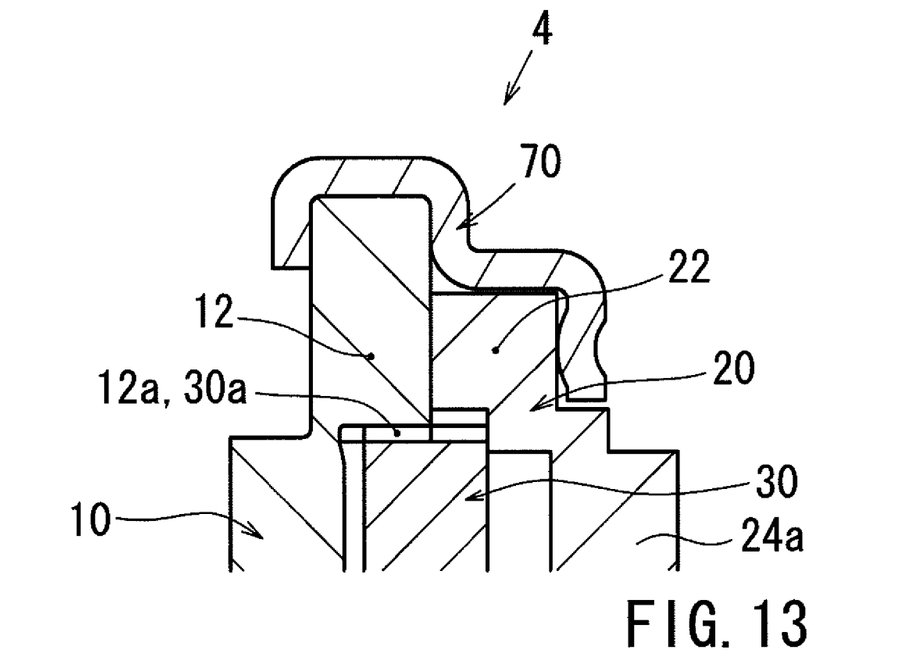
FIG. 13 is an enlarged partially cross-sectional view, which illustrates a modified form of the reclining device.

Further, as shown in FIG. 13, the first housing 10 can be modified to omit the flanged portion 15. In addition, the second housing 20 can be modified so as to have a flanged portion (not shown) that is capable of encircling a portion of the wall portion 12 of the first housing 10.

What is claimed is:

1. A connecting device that is capable of rotatably connecting a first component and a second component of a vehicle seat, comprising:
   first and second connecting elements that are axially oppositely coupled to each other so as to be rotatable relative to each other;
   a locking member that is positioned between the first and second connecting elements, the locking member being radially movably attached to the second connecting element and has an outwardly-faced toothed portion, and the outwardly-faced toothed portion being arranged and constructed to engage an inwardly-faced toothed portion formed in the first connecting element, thereby preventing the first and second connecting elements from rotating relative to each other;
   an operating member that is positioned between the first and second connecting elements, the operating member being arranged and constructed to radially move the locking member such that the outwardly-faced toothed portion of the locking member can be engaged with or disengaged from the inwardly-faced toothed portion of the first connecting element; and
   a retainer member that is arranged and constructed to circumferentially clamp the first and second connecting elements, thereby preventing the first and second connecting elements from being axially separated from each other,
   wherein the retainer member has a retainer portion and is fixed to the first connecting element while the second connecting element is axially supported by the retainer portion of the retainer member, and
   wherein the first connecting element has a support portion, the second connecting element has an annular wall portion that is axially projected therefrom, and the support portion of the first connecting element is arranged and constructed to circumferentially encircle the annular wall portion of the second connecting element when the first and second connecting elements are coupled to each other.

2. The connecting device as defined in claim 1, wherein the retainer member is fixed to the first connecting element by crimping.

* * * * *